Dec. 25, 1951          R. S. VORIS                2,580,335
                    MANUFACTURE OF DDT
                     Filed Jan. 8, 1945
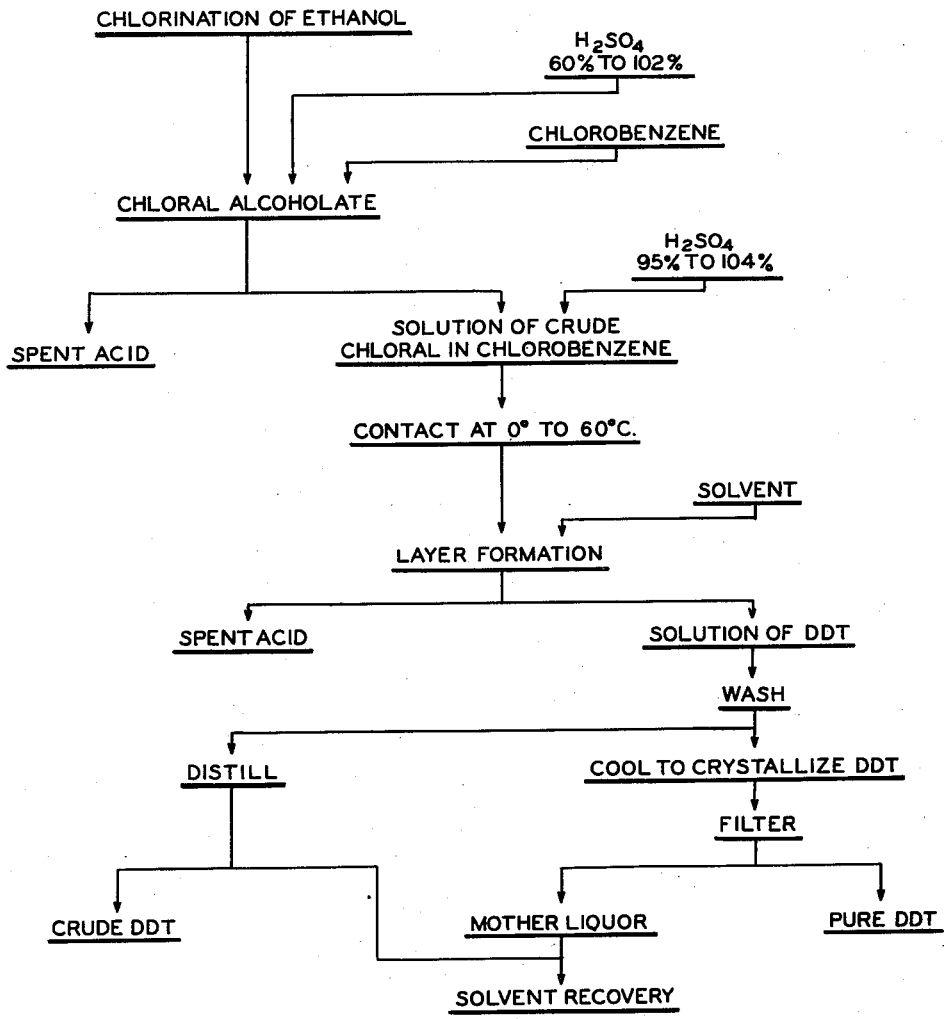
Robert S. Voris
INVENTOR.
BY Cleveland B. Hallabaugh
ATTORNEY Patented Dec. 25, 1951

2,580,335

UNITED STATES PATENT OFFICE 2,580,335

MANUFACTURE OF DDT

Robert S. Voris, Wilmington, Del., assignor to Hercules Powder Company, Wilmington, Del., a corporation of Delaware Application January 8, 1945, Serial No. 571,937

11 Claims. (Cl. 260—649)

This invention relates to an improved process for the manufacture of 1,1,1-trichloro-2,2-bis(p-chlorophenyl)ethane.

It is well known that 1,1,1-trichloro-2,2-bis(p-chlorophenyl)ethane (an insecticidal material commonly known as DDT) may be prepared by condensing chloral with chlorobenzene in the presence of sulfuric acid. However, the process is a long and costly procedure involving many operations. The chloral used in the condensation is prepared by the chlorination of ethanol which produces crude chloral alcoholate which in turn is contacted with 95% sulfuric acid to form a crude chloral. This crude chloral must then be purified by distillation and subsequent formation of chloral hydrate. The latter is recrystallized and finally treated with 95% sulfuric acid to form a chloral of sufficient purity to be used in the condensation reaction. After the condensation with chlorobenzene, the crude DDT reaction mixture is either poured on ice and filtered, or filtered directly, and the crude DDT is washed and dried. This crude DDT must then be recrystallized from a suitable solvent in order to obtain a pure product.

Now is accordance with this invention it has been discovered that 1,1,1-trichloro-2,2-bis(p-chlorophenyl)ethane may be prepared by a process which eliminates many of the steps in the prior art processes, and which at the same time yields a pure product in good yield. The improved process of this invention involves the steps of chlorinating ethanol to form chloral alcoholate, contacting a mixture of the chloral alcoholate and chlorobenzene with sulfuric acid of 60% to 102% concentration by weight to liberate free chloral, contacting the solution of chloral in chlorobenzene with sulfuric acid, of about 95% to about 104% by weight, at a temperature of from about 0° C. to about 60° C., adding to the reaction mixture a solvent in which the DDT is soluble but which is immiscible with the sulfuric acid, separating the acid layer, washing the solution layer to remove the acid, and recovering the 1,1,1-trichloro-2,2-bis(p-chlorophenyl)ethane.

The accompanying diagram is a flow sheet indicating the flow of materials in accordance with this invention. Any convenient form of apparatus may be used in carrying out the process. The process of the invention wi'l be described in detail in the following examples which illustrate specific modes of carrying out the process:

Example I

Ethanol was chlorinated by passing chlorine (4 mols.) into ethanol (2 mols.) at a temperature of 50° C. to 55° C. for 10 hours or until a density of about 1.2 was reached, the temperature was then al'owed to rise to 55° C. to 75° C. for about 10 hours as the chlorination continued and finally the batch was heated to 85° C. during the last 10 hours. The chlorination is complete when a specific gravity of 1.5 has been reached, which corresponds to a chlorine content of 55%.

One mole of chlorobenzene and a weight of 95% sulfuric acid equal to the weight of chloral alcoholate were then added. After being agitated for ½ hour, an additional 1.2 mols. of chlorobenzene were added and the mass was allowed to stand in order for the layers to separate. The lower layer of spent acid was withdrawn and 104% $H_2SO_4$, i. e. 100% $H_2SO_4$, containing a 20% excess of $SO_3$ was gradua'ly added with agitation, the temperature being held at 0° C. to 5° C. The quantity of acid was calculated to take up one mole of water and end with 97.5% sulfuric acid based on $SO_3$ content. Agitation was continued at the same temperature until the total reaction time was about 4½ hours.

Hexane, previously heated to about 60° C., was added to the reaction mixture until the hot hexane solution had a density of 0.8 to 0.9 and the batch was heated to 60° C. to 65° C. for ½ to 1 hour to assure complete solution of the DDT, and after set+ling, the acid layer was withdrawn. The hot hexane solution was washed with water, then with a 25% solution of sodium bicarbonate, and finally with water until the solution was neutral. The hot hexane solution was filtered to remove any metallic oxides or salts and then was run to a crysta'lizer where it was cooled to 40° C. to 50° C. and finally to 5° C. to 25° C. The slurry of crystals was centrifuged and the mother liquor run to a recovery still to obtain recovered solvent. The crystals of DDT were dried at 60° C. for 2 hours. A yield of 51%, based on the weight of crude alcoholate used, was obtained by this process. The product had a setting point of 102° C.

Example II

Examp'e I was repeated except that the condensation reaction was carried out at 25° C. to 35° C. A yield of 42% based on the weight of alcoholate used was obtained. The product had a setting point of 104.8° C.

Example III

Example II was repeated except that a petroleum hydrocarbon, having a boiling point range of 96° C. to 127° C. and specific gravity of 0.72, was used as the solvent to extract the DDT from the reaction mixture instead of hexane. A yield of 36% based on the weight of alcoholate used was obtained. The product had a setting point of 105° C.

*Example IV*

Chloral alcoholate was prepared as described in Example I. One mole of chlorobenzene and a weight of 95% sulfuric acid equal to the weight of chloral alcoholate were then added. After being agitated for ½ hour, an additional 1.2 mols. of chlorobenzene were added and the mass was allowed to stand in order for the layers to separate. The lower layer of spent acid was withdrawn and 104.5% sulfuric acid was gradually added with agitation, the temperature being held at 0° C. to 10° C. The quantity of acid was calculated to take up 1 mole of water and end with 101.5% sulfuric acid based on $SO_3$ content. Agitation was continued at the same temperature until the total reaction time was about 5½ hours.

A quantity of ethylene dichloride sufficient to dissolve the DDT, approximately 5 mols., was added and the batch was heated to 35° C. to 40° C. to assure complete solution of the DDT, and after settling, the acid layer was withdrawn. The warm ethylene dichloride solution was washed with water, then with a 10% solution of sodium bicarbonate and finally with water until the solution was neutral. The solution of DDT was then steam distilled to remove the solvent. The yield of crude DDT, obtained as a residue, was 85% and it had a setting point of 87° C. This crude DDT was recrystallized from isopropyl alcohol. The recrystallized product had a setting point of 104° C. and was obtained in a yield of 57% based on the weight of alcoholate used.

In the chlorination step, ethanol of about 95% to 100% by volume concentration may be used. An excess of chlorine of from about 20% to about 50% speeds up the chlorination operation. If desired, a chlorination catalyst may be used, however, the reaction takes place readily without the use of a catalyst.

The temperature of the chlorination may be varied to suit the equipment and the size of the batch. Usually it is desirable to chlorinate at about a reflux temperature at the beginning of the operation, heating the mass to maintain the reflux temperature as the chlorination proceeds. However, the chlorination may proceed at a much lower temperature in the first stages, if desired. The fast chlorination at reflux temperature is advantageous in that it avoids building up any appreciable quantity of ethyl hypochlorite and also avoids production of ethyl chloride as a by-product.

The chlorination should proceed until a chlorine content of about 55%, the theoretical value for chloral alcoholate, is reached, which corresponds to a specific gravity of about 1.5. Over chlorination should be avoided, as a chlorination above a specific gravity of 1.52 and chlorine content of 62% produces an alcoholate which exhibits a pronounced tendency to polymerize in the presence of sulfuric acid.

The exit gases from the chlorination consist of hydrogen chloride and unused chlorine. They may be run to a lime slurry for neutralization or they may be run to a hydrochloric acid recovery system.

The chlorobenzene necessary for the condensation reaction is added before the dealcoholization of the chloral alcoholate. In some cases it is desirable to add only a portion of the requisite chlorobenzene before the dealcoholization step and the remainder just before the condensation step. This is particularly true if the chloral alcoholate is to be stored for any time before use in the condensation reaction. Pure chloral alcoholate has a melting point of 45° C. and crude alcoholates deposit crystals on storage; however, solutions containing one mole of chlorobenzene per mole of chloral alcoholate do not crystallize down to $-20°$ C. For this reason, it is advantageous to add approximately half of the required chlorobenzene to the chloral alcoholate. The whole amount of chlorobenzene could be added at this time, but this involves the necessity of greater storage facilities. If the chloral alcoholate is to be used immediately in the condensation step, the remainder of the necessary amount of chlorobenzene may be added after the dealcoholization reaction but before the separation of the chloral from the acid.

The addition of chlorobenzene before contacting the chloral alcoholate with sulfuric acid has many advantages. Chloral has a specific gravity of 1.5, whereas that of the acid is 1.8, and the mechanical separation of the two is not easily carried out. Therefore, the chloral must be distilled from the acid. The chloral so obtained by the prior art processes was purified by redistillation over calcium carbonate. The redistilled chloral was then treated with water to form the hydrate which was crystallized and then treated with acid to liberate a chloral sufficiently pure for the condensation reaction.

Chloral is soluble in chlorobenzene and the latter having a lower density (sp. gr. 1.1) compared to that of chloral (sp. gr. 1.5) or the acid (sp. gr. 1.7 to 1.8) makes it possible to separate the chloral by withdrawing the spent acid layer. Thus, the more laborious distillation step is avoided. In addition it has been found that the chloral obtained by the separation of the chlorobenzene solution of chloral from the acid mixture is of sufficient purity to be used directly in the condensation step, thereby eliminating the many chloral purification steps which previously were necessary.

An excess of chlorobenzene up to about 150% may be used if desired. In fact it may be used as the solvent in the final extraction step although this solvent has the disadvantage of retaining a large quantity of the DDT in solution after crystallization, due to the solubility of DDT in chlorobenzene, and so results in a lower yield of product.

The concentration of sulfuric acid added to bring about the condensation reaction between the chloral and chlorobenzene, may be varied from about 95% to about 104% sulfuric acid and is preferably from about 98% to about 102%. By a sulfuric acid of greater than 100% is meant 100% sulfuric acid containing excess $SO_3$, e. g. 104% sulfuric acid is 100% sulfuric acid containing 20% excess of $SO_3$, which is sufficient to make 104% of the original weight of 100% acid, if water equivalent to the $SO_3$ were added.

The acid may be added to the solution of chloral in chlorobenzene all at once or gradually. The latter method is usually preferable as the temperature is then more readily controlled. If desired, a more dilute acid such as about 95% sulfuric acid may be added and oleum subsequently added in order to maintain the acid concentration as the reaction proceeds. The concentration of sulfuric acid should be maintained above about 95% throughout the condensation.

Any sequence of addition of the materials may be utilized in the condensation reaction. The acid may be added to the combination of chloral and chlorobenzene or vice versa, or the combination of chloral and chlorobenzene may be added simultaneously with the acid to the reaction vessel.

The temperature of the condensation reaction may be varied from about 0° C. to about 60° C. and is preferably from about 0° C. to about 35° C. Temperatures above about 35° C. tend to decrease the yield of product due to sulfonation of the chlorobenzene which occurs more readily at higher temperatures.

An inert solvent which is a solvent for DDT and which is immiscible with the acid components of the reaction mixture may be used for the extraction of the condensation reaction mixture. As previously noted, chlorobenzene could be used for this purpose, however, the amount of DDT retained by the chlorobenzene greatly lowers the yield of product. Suitable solvents for the extraction of the DDT from the reaction mixture are petroleum hydrocarbons such as petroleum ether, ligroin, kerosene, etc., aromatic hydrocarbons such as benzene, and chlorinated solvents such as ethylene dichloride, carbon tetrachloride, chlorobenzene, etc. Of particular value are petroleum hydrocarbons consisting essentially of hydrocarbons containing from about six carbon atoms to about nine carbon atoms. Petroleum fractions containing the lower hydrocarbons do not have the requisite solubility for DDT and are too low boiling for easy handling, whereas the higher petroleum fractions retain too much of the DDT in solution due to the greater solubility for DDT. A petroleum hydrocarbon fraction consisting essentially of $n$-hexane and other hexanes is especially valuable as it is free of unsaturates which are sulfonated by the sulfuric acid of the reaction mixture and, in addition, has the required degree of solubility for DDT.

The extraction of the reaction mixture with a solvent immiscible with the acid material makes it possible to separate the DDT readily by mechanical separation of the two layers. It also makes it possible to obtain a pure product without going through a separate recrystallization step which is not only laborious, but results in the loss of a considerable amount of the product. Thus the extraction has eliminated several steps that previously were necessary in order to obtain a product of the same degree of purity.

The solvent solution of DDT is washed with water until acid free. To avoid a prolonged water-washing operation, the solution may be washed with water, then washed with an alkali wash such as an aqueous sodium carbonate, potassium carbonate, sodium hydroxide or aqueous ammonia wash, and finally with water.

The solution of DDT may be crystallized by cooling to room temperature or lower and the crystalline material obtained by filtration. If a crude product is desired, the solvent may be evaporated by steam and/or vacuum distillation, leaving the crude DDT as a residue.

The product obtained by the process of this invention when crystallized from the solution is very pure, generally having a setting point of 95° C. to 106° C., compared to the setting point of pure DDT which is 106° C. High yields of this pure material are obtained by the process of this invention based on the overall reaction.

The process in accordance with this invention eliminates many of the steps heretofore required and has effected great economies in the production of DDT. The elimination of the necessity for purifying the chloral used means an enormous saving in time, labor and equipment. The crystallization of the product from the solvent extract of the reaction mixture eliminates the necessity of isolating an intermediate crude DDT which must be recrystallized in order to get a pure material, and also results in such savings, as well as a saving in the yield of the product, since the recrystallization of any material means a considerable loss of that material.

What I claim and desire to protect by Letters Patent is:

1. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 95% to about 105% by weight at a temperature of about 0° C. to about 60° C., adding to the reaction mixture a solvent selected from the group consisting of petroleum hydrocarbons, aromatic hydrocarbons, and chlorinated hydrocarbons, separating the acid layer, washing the solution layer to remove the acid, and recovering the 1,1,1-trichloro-2,2-bis(p-chlorophenyl)ethane.

2. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 95% to about 104% by weight at a temperature of about 0° C. to about 60° C., adding to the reaction mixture a solvent selected from the group consisting of petroleum hydrocarbons, aromatic hydrocarbons, and chlorinated hydrocarbons, separating the acid layer, washing the solution layer to remove the acid, and crystallizing the 1,1,1-trichloro-2,2-bis(p-chlorophenyl)ethane from a solvent.

3. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 95% to about 104% by weight at a temperature of about 0° C. to about 60° C., adding a petroleum hydrocarbon solvent consisting essentially of at least one hydrocarbon containing between six and nine carbon atoms, separating the acid layer, washing the solution layer to remove the acid, and recovering the 1,1,1-trichloro-2,2-bis(p-chlorophenyl)ethane.

4. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 98% to about 102% by weight at a temperature of about 0° C. to about 35° C., adding hexane, separating the acid layer, washing the solution layer to remove the acid, and recovering the 1,1,1-trichloro-2,2-bis(p-chlorophenyl)ethane.

5. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 98% to about 102% by weight at a temperature of about 0° C. to about 35° C., adding hexane, separating the acid layer, washing the solution layer to remove the acid, and crystallizing the 1,1,1-trichloro - 2,2 - bis(p - chlorophenyl)ethane from the solution.

6. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 95% to about 104% by weight at a temperature of about 0° C. to about 60° C., adding a petroleum hydrocarbon mixture having a boiling range of about 96° C. to about 127° C., separating the acid layer, washing the solution layer to remove the acid, and recovering the 1,1,1-trichloro-2,2-bis-(p-chlorophenyl)ethane.

7. The process of preparing 1,1,1-trichloro-2,2-bis (p-chlorophenyl)ethane which comprises the steps of chlorinating ethanol to form choral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 95% to about 104% by weight at a temperature of about 0° C. to about 60° C., adding ethylene dichloride separating the acid layer, washing the solution layer to remove the acid, and recovering the 1,1,1-trichloro-2,2-bis(p-chlorophenyl)ethane.

8. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 98% to about 102% by weight at a temperature of about 0° C. to about 35° C., adding ethylene dichloride, separating the acid layer, washing the solution layer to remove the acid, and recovering the 1,1,1-trichloro-2,2-bis(p-chlorophenyl)-ethane.

9. The process of preparing 1,1,1-trichloro-2,2-bis(p-chlorophenyl)ethane which comprises the steps of chlorinating ethanol to form chloral alcoholate, contacting a mixture of the chloral alcoholate and chlorobenzene with sulfuric acid of about 60% to about 102% concentration by weight to liberate free chloral, then contacting the solution of chloral in chlorobenzene with sulfuric acid of a concentration of about 98% to about 102% by weight at a temperature of about 0° C. to about 35° C., adding ethylene dichloride, separating the acid layer, washing the solution layer to remove the acid, and crystallizing the 1,1,1-trichloro-2,2-bis(p-chlorophenyl)-ethane from a solvent.

10. In the preparation of 1,1,1-trichloro-2,2-bis(p-chlorophenyl)ethane by the condensation of chloral with chlorobenzene, the step which comprises extracting the crude reaction mixture containing the said compound with a solvent selected from the group consisting of petroleum hydrocarbons, aromatic hydrocarbons, and chlorinated hydrocarbons and recovering the 1,1,1-trichloro-2,2-bis(p-chlorophenyl)ethane from the extractant.

11. In the preparation of 1,1,1-trichloro-2,2-bis(p-chlorophenyl)ethane by the condensation of chloral with chlorobenzene, the step which comprises extracting the crude reaction mixture containing the said compound with a petroleum hydrocarbon solvent consisting essentially of at least one hydrocarbon containing between 6 and 9 carbon atoms and crystallizing the 1,1,1-trichloro - 2,2 - bis(p-chlorophenyl)ethane from the extractant.

ROBERT S. VORIS.

REFERENCES CITED

The following references are of record in the file of this patent:

UNITED STATES PATENTS

| Number | Name | Date |
|---|---|---|
| 774,151 | Besson | Nov. 8, 1940 |
| 2,243,543 | Ter Horst | May 27, 1941 |
| 2,329,074 | Muller | Sept. 7, 1943 |
| 2,464,265 | Searle | Mar. 15, 1949 |
| 2,547,689 | Cass | Apr. 3, 1951 |

OTHER REFERENCES

Wood et al.: "U. S. Dispensatory," 23rd ed. page 293.

Groggins: "Unit Processes in Organic Syntheses," first edition pp. 192–4, (1935).

DDT Report 44–2, W. P. B. Contract 180, June 17, 1944, (10 pages).